March 23, 1965  G. H. ELLIOTT ETAL  3,175,070
WELDING APPARATUS AND METHOD
Filed July 6, 1962  3 Sheets-Sheet 1
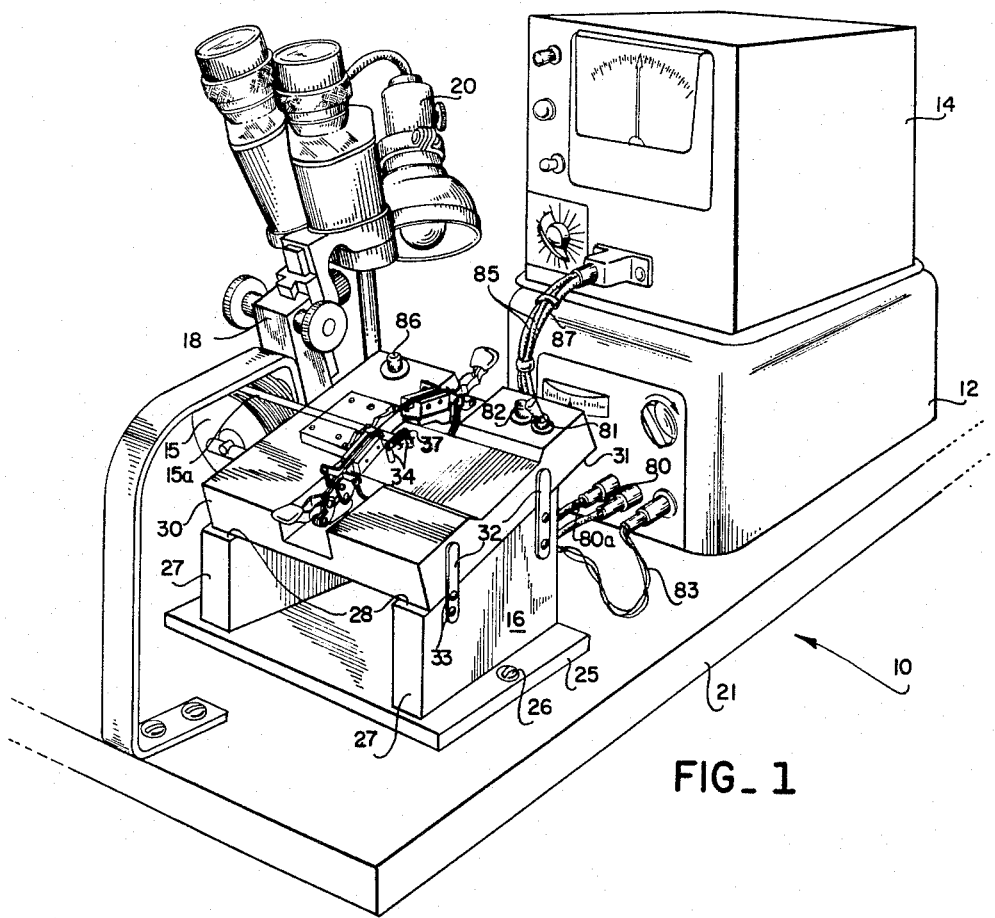
FIG_ 1
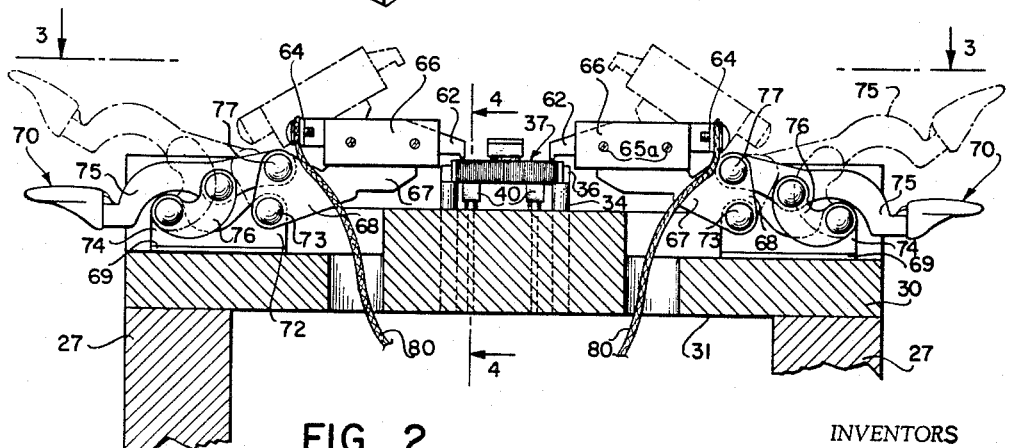
FIG_ 2
INVENTORS
GEORGE H. ELLIOTT
WILBUR W. MAVES
By R. E. Geangue
Attorney

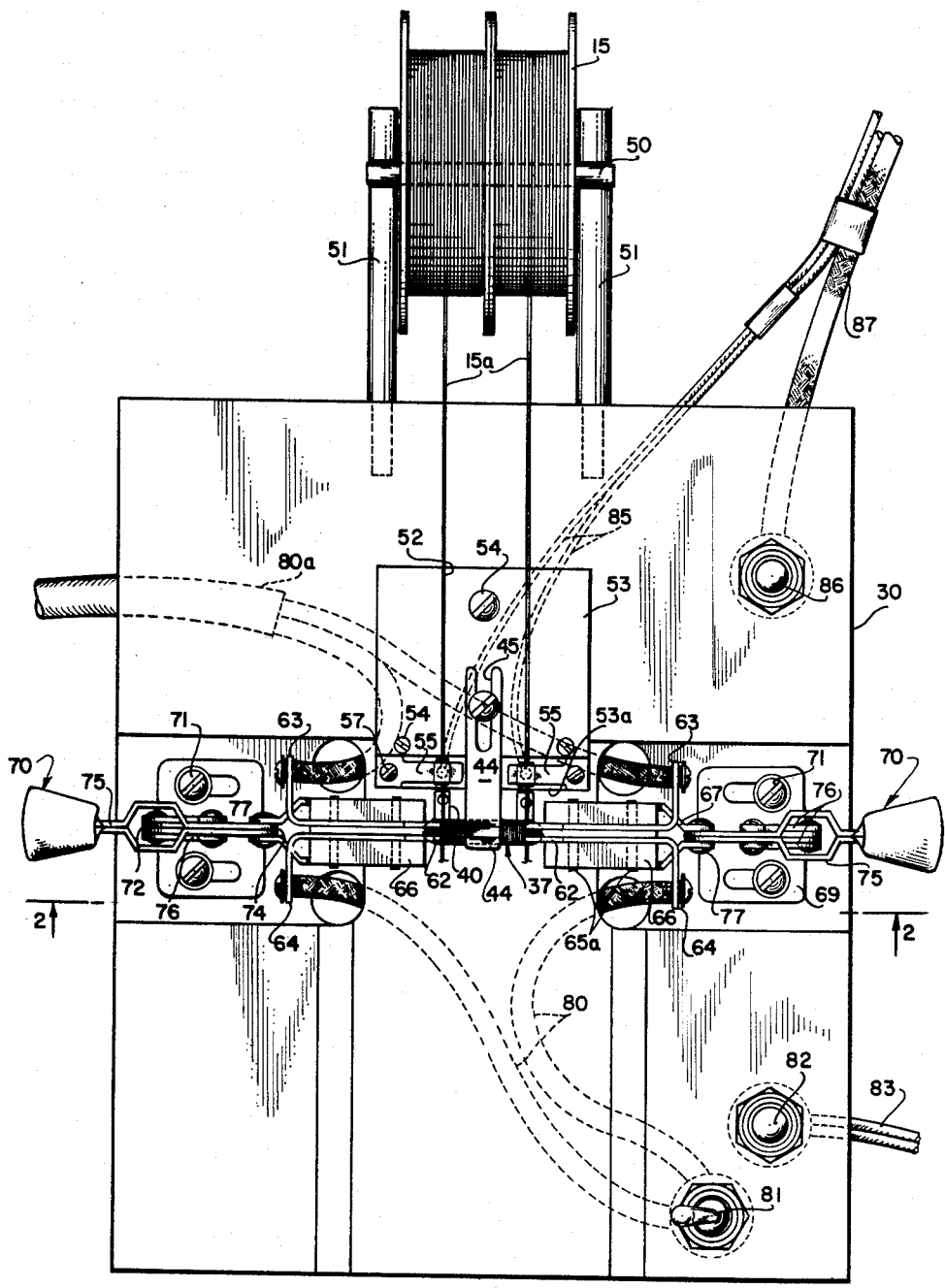
FIG_3

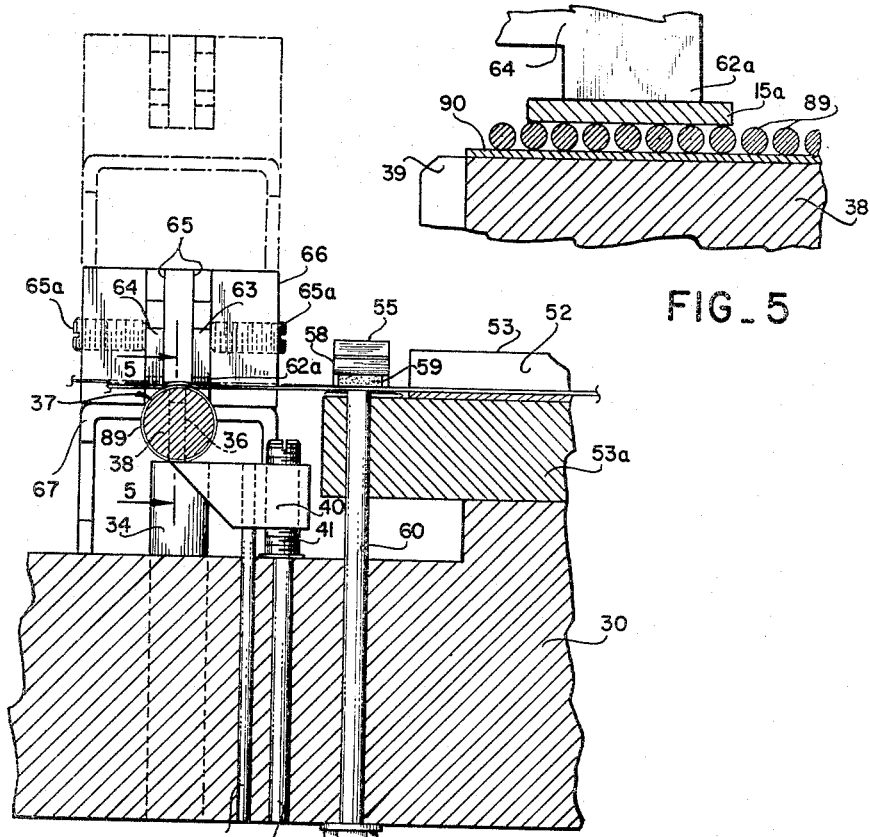
FIG_5
FIG_4
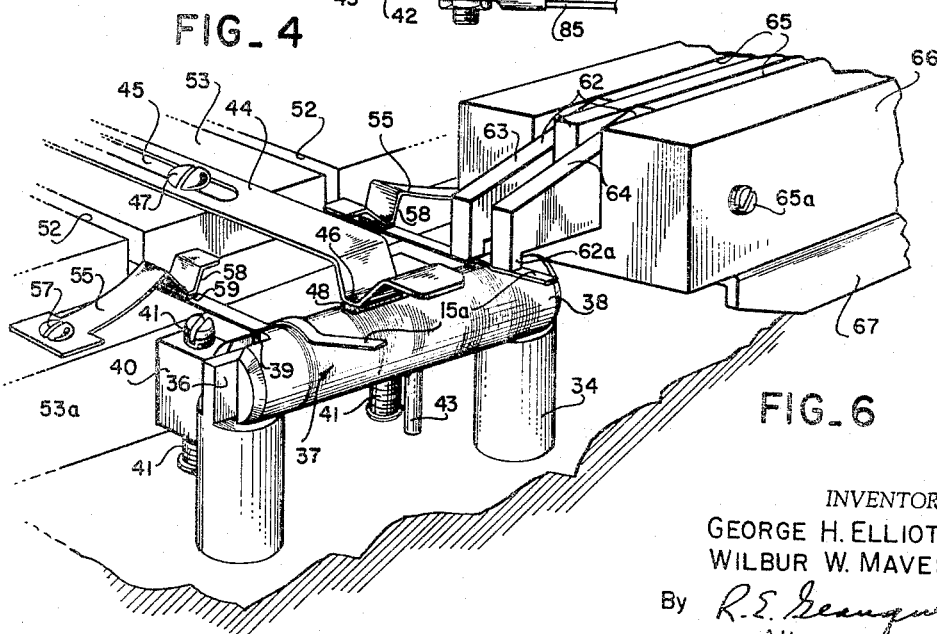
FIG_6
INVENTORS
GEORGE H. ELLIOTT
WILBUR W. MAVES
By R.E. Geangue
Attorney

United States Patent Office 3,175,070
Patented Mar. 23, 1965

3,175,070
WELDING APPARATUS AND METHOD
George H. Elliott, Van Nuys, and Wilbur W. Maves, La Canada, Calif., assignors to Atohm Electronics, Sun Valley, Calif., a corporation of California
Filed July 6, 1962, Ser. No. 208,012
17 Claims. (Cl. 219—78)

This invention relates to the art of welding and more particularly to a new and useful apparatus for, and a method of, welding.

In making electrical resistance elements, it is customary to wind a resistance-type wire on an insulated core or mandrel. Leads must be brought out from appropriate locations on the resistance element to connect it in an electrical circuit or circuits. One prior art method of bringing these leads out consists of unwinding individual turns of wire from the mandrel and welding suitable termination tabs thereto. This is done by what is commonly referred to as a pressure welding method and is accomplished by carrying one side of the welding current through the turn of wire and the other side of the current through the termination tab while the wire and the tab are held together under pressure. While generally satisfactory, this method of welding does have certain drawbacks.

During the welding operation, both pressures must be equal and both surfaces must be clean. The weld takes place at the point of pressure and it is very difficult to obtain a uniform weld on both parts. This is especially true where very small wires are being welded and results in the rejection of many elements because of non-uniform welds. It is also rather time consuming to weld very fine wire because the unwinding and welding operations must be done under a microscope.

Another drawback of the pressure welding method resides in the fact that the welding current overheats the wire not only in the vicinity of the weld, but for an appreciable distance adjacent thereto. This overheating changes the crystalline structure of the overheated section resulting in brittleness which makes the wire susceptive to breaking when subjected to vibrations and fracturing when subjected to wide temperature differentials. In addition, it is rather difficult to obtain a material for the tabs which can be successfully welded to the resistance wire by the pressure welding method without increasing the electrical resistance at the terminal over acceptable values and which is compatible with the wire so that electrolysis will not occur between the two.

The apparatus and method of the present invention, on the other hand, makes it possible to weld the tabs on electrical resistance elements without unwinding any turns, employs a series weld instead of a pressure weld, and produces a uniform weld without adding resistance or changing the crystalline structure of the wire. Instead of carrying the current through the wire, as heretofore, the current is passed only through the tab so that the tab becomes heated and supplies the heat to fuse the wire to it. The tab has a higher melting point than the wire of the resistance element and, in those cases where small wires are used for the resistance element, the tab is wide enough to span numerous turns of wire on the mandrel so that a mass of small wire fuses to the tab, resulting in minimum termination resistance and maximum strength.

In view of the foregoing factors and conditions characteristic of apparatus for, and methods of, welding, it is a primary object of the present invention to provide a new and improved apparatus for, and a method of, welding which is not subject to the disadvantages enumerated above.

Another object of the invention is to provide an apparatus for, and a method of, welding termination tabs or taps to electrical resistance wiring efficiently, safely, and expeditiously.

Yet another object of the invention is to provide an apparatus for performing series welding operations.

Still another object of the invention is to provide a method of series welding wherein a weld is consummated midway between positive and negative electrodes passing welding current through one, only, of the two materials to be welded together.

A further object of the invention is to provide an apparatus for, and a method of, welding termination tabs to very small electrical resistance wires by providing a tab having a higher melting point than the resistance wires and fusing a number of the resistance wires together and into the tab.

Yet another object of the invention is to provide a method of welding wherein a first material can be welded to a second material by passing electrical power lengthwise through the first material in such a manner that it heats at its mid-section and supplies heat to fuse-unite with the second material.

Another object of the invention is to provide a welding apparatus which is so constructed and designed that termination tabs may be welded to resistance elements and the resistance of the element may be measured before it is removed from the welding apparatus.

A further object of the invention is to provide a welding apparatus which is so constructed and arranged that a continuous ribbon of electrical resistance wire may be fed into the welding apparatus and welded to resistance elements in a continuous operation.

These and other objects will appear upon reading the following specification and claims and upon considering in connection therewith the attached drawings to which they relate.

Referring now to the drawings in which a presently preferred embodiment of the invention is illustrated:

FIGURE 1 is a view in perspective of the welding apparatus and test equipment of the invention;

FIGURE 2 is a vertical sectional view taken on line 2—2 of FIGURE 3 showing a welding apparatus of the invention with an electrical resistance element in position to be worked upon;

FIGURE 3 is a plan view of the welding apparatus of FIGURE 2;

FIGURE 4 is a fragmentary sectional view taken on line 4—4 of FIGURE 2 on an enlarged scale showing an electrical resistance element in welding position;

FIGURE 5 is a fragmentary sectional view taken on line 5—5 of FIGURE 4 on an enlarged scale showing one electrode of the welding apparatus in position on top of a metallic tab; and FIGURE 6 is a view in perspective on an enlarged scale of a portion of welding apparatus shown in FIGURE 1.

Referring again to the drawings and more particularly to FIGURE 1, the welding apparatus constituting the present invention, generally designated 10, includes a precision, stored-energy type welding machine 12, a percentage-bridge type test unit 14, a plurality of spools of ribbon-type tab material 15 and a welding jig 16. A microscope 18 and a lamp 20 are mounted above the jig 16. The welding apparatus 10 may be mounted on a suitable table or a base plate 21.

The welding jig 16 includes a base plate 25 which is secured to the base plate 21 by means of screws 26, only one of which is shown. A pair of upstanding blocks 27 are rigidly affixed to the base plate 25 and have upwardly sloping upper faces 28. The welding jig 16 also includes a main body portion 30 having a flat lower face 31 which rests upon sloping upper faces 28 of blocks 27 and is maintained in position thereon by means of clips 32 which are attached to the blocks 27 by means of screws 33. While only one pair of clips 32 is shown for purposes of illustration, it is to be understood that an identical pair will be similarly disposed on the other block 27.

Referring now to FIGURES 1–6 of the drawings, a pair of upstanding posts 34 having integral tangs 36 at their upper ends are mounted in spaced relation on the body portion 30 of the jig 16 and are insulated from each other. A space-wound resistance element 37 includes a mandrel 38 having notches 39 cut in each end and is positioned laterally relative to the body portion 30 of jig 16 by the tangs 36 which engage the notches 39. The mandrel 38 is positioned vertically upon the posts 34 by means of insulated platforms 40 (FIGURE 4) which are threadably engaged by adjusting screws 41. Each adjusting screw 41 includes a pin portion 42 which is rotatably mounted on the jig 16 so that the adjusting screws may be turned while the platforms 40 are prevented from turning by rods 43 which are secured to both the platforms 40 and the jig 16. The spools 15 are rotatably mounted on a shaft 50 which is supported by a pair of rods 51 at the end of the jig 16. Tab material 15a from the spools 15 is fed through grooves 52 in a first block 53 which is mounted on a second block 53a. The blocks 53 and 53a are secured to the base portion 30 of jig 16 by means of screws 54. A pair of spring-type hold-down clips 55 is secured to the block 53a adjacent one end of the first block 53 by means of screws 57 and include depending portions 58 (FIGURE 6). A resilient pad 59 is attached to the underside of each depending portion 58 and contacts the tab material 15a to maintain it in firm contact with the upper end of an upstanding, current carrying rod 60 which is mounted on the jig 16.

A pair of electrodes 62 are pivotally mounted adjacent each post 34. Each pair of electrodes 62 includes a positive electrode 63 and a negative electrode 64 which have depending portions 62a and are mounted in grooves 65 in an insulated block 66. The electrodes 63 and 64 are maintained in position in the grooves 65 by means of set screws 65a. Each block 66 is rigidly affixed to a pair of brackets 67 which have a depending projection 68 pivotally connected to a rigid base plate 69 forming part of a toggle clamp 70. The base plate 69 is secured to the body portion 30 of the jig 16 by means of screws 71 and includes a first upstanding projection 72 to which the brackets 67 are pivotally connected by means of a pin 73 and a second upstanding projection 74 to which a lever portion 75 of the clamp 70 is linked by means of a pair links 76. The forward end of the lever 75 is pivotally connected by means of a pin 77 to the brackets 67 above the pin 73. When the lever 75 is pressed downwardly, the links 76 move to the left, as viewed in FIGURE 2, causing the brackets 67 to pivot in a counterclockwise direction, as viewed in FIGURE 2, about the pivot pin 73 bringing the depending portions 62a of the electrodes 62 into contact with the tab material 15a superjacent the resistance element 37.

The negative electrodes 64 are connected to the welder 12 through a pair of conductors 80. A double throw switch 81 is connected in the circuit with the electrodes 64 and the welding machine 12 and will be thrown in one position when current is to be supplied to one negative electrode 64 and in another position when current is to be supplied to the other negative electrode 64. The positive electrodes 63 are connected to the welder 12 by conductors 80a. The distance between the negative electrodes 64 and the positive electrodes 63 of each pair is approximately 5½ times the width of the ribbon of tab material 15a. The tab 15a is crowned about the upper periphery of the element 37, as shown in FIGURE 6, by any suitable means, such as pressure applied by the electrodes 62. The platforms 40 are adjusted vertically to obtain the proper pressure from the electrodes 62. A push button switch 82 is mounted on the jig 16 and is connected through conductors 83 to the welder 12 to energize it by depressing the button 82.

The current carrying posts 60 are connected in an electrical circuit with the test unit 14 through conductors 85. The test unit 14 is energized by pressing a push button switch 86 which is connected thereto through conductors 87. The current carrying posts 60 place the resistance element 37 in a circuit with the test unit 14 through the windings of the resistance element 37 and the welded tab material 15a so that the resistance of the element 37 may be measured before taking it out of the welding jig 16.

Referring now to FIGURE 5, it is to be noted that the width of the tab material 15a is sufficient to span a plurality of turns of bare, electrical resistance wire 89 which is space wound on the mandrel 38. The wire 89 is insulated from the mandrel 38 by a layer of insulation 90. The wire 89 may consist of any suitable resistance type material, such as Ni-Cr alloy. Wires as small as 0.00035″ have been welded by employing the apparatus and method of the invention. The tab material 15a may consist of any suitable material which is compatible with the wire 89 and which has (1) low T–C characteristics, (2) a fixed resistance, and (3) a melting point substantially higher than the melting point of the wire 89. A 0.010 x 0.00085″ molybdenum ribbon was found to be suitable for use with the aforementioned Ni-Cr wire. The melting point of the ribbon exceeded that of the wire by approximately 1000° F.

Operation of the device will be readily understood. Assuming that (1) the electrodes 62 are in their up position, (2) the tab material 15a extends through the grooves 52 to a point intermediate the posts 34 and the hold-down clips 55, and (3) the resistance element 37, having a predetermined diameter, has been employed as a guide to position the platforms 40 vertically in such a manner that the depending portions 62a of the electrodes 62 will, when in their operative position, crown the tab material 15a about the upper perimeter of element 37, as shown in FIGURE 6, bringing the tab material 15a into intimate contact with the wire 89, then the element 37 is placed in the welding jig 16 by engaging the tangs 36 on post 34 with the notches 39. The hold-down clip 44 is adjusted in such a manner that the pad 48 contacts the upper surface of the resistance element 37 and maintains it firmly in position on the platforms 40 and the posts 34. A length of tab material 15a is then drawn across each end of the resistance element 37 and the hold-down clips 55 are adjusted to assure that the pads 59 contact the tab material 15a with a uniform, firm pressure. The lever 75 may then be depressed bringing the electrodes 62 into firm engagement with the tab material 15a upon the resistance element 37. The switch 81 may then be thrown to a position which completes an electrical circuit to a first set of the electrodes 62. The button 82 is depressed to energize the welding machine 12 and weld the tab material 15a to one end of the element 37. The switch 81 may then be thrown to its second position whereby the other set of electrodes 62 is placed in a circuit with the welding machine and the button 82 again depressed to supply welding power to the other set of electrodes 62 to weld the tab material 15a to the other end of the element 37. The hold-down clip 44 may then be elevated above the resistance element 37 and the test button 86 depressed to measure the resistance of element 37 by placing it in a circuit with the test unit 14 through the current conducting rods 60 and conductors 85. Upon completion of the test, each strip of tab material 15a is severed at a point intermediate the resistance element 37 and the respective hold-down clip 55.

While operation of the device has been described in connection with welding a strip of tab material 15a to opposite ends of the resistance element 37 in consecutive steps, it is to be understood that by eliminating the switch 81 and balancing the electrical leads to the electrodes 62, both welds may be performed simultaneously.

An example of welding in accordance with the method of the invention is as follows:

A 0.105" insulated, copper mandrel, which had previously been space wound with bare 0.0005" Ni-Cr alloy wire, was obtained. A short length of 0.010 x 0.00085" molybdenum ribbon was placed transversely across each end of the wound mandrel and crowned in such a manner that it intimately contacted the upper periphery of seventeen strands of the Ni-Cr wire. Spaced negative and positive welding electrodes were brought into firm contact with each ribbon and approximately 1 watt sec. of electrical power was supplied to each set of electrodes thereby heating the ribbons sufficiently to fuse the wire and weld it thereto.

While the particular apparatus and method herein shown and described in detail are fully capable of obtaining the objects and providing the advantages hereinbefore stated, it is to be understood that they are merely illustrative of the presently preferred embodiments of the invention and that no limitations are intended to the details of construction, design or process steps herein shown other than as defined in the appended claims.

We claim:
1. Apparatus for welding electrical tabs to wire on electrical resistance elements comprising:
   a welding jig having a body portion;
   platform means mounted on said body portion for supporting said electrical resistance elements;
   a pair of horizontally spaced welding electrodes pivotally mounted on said body portion adjacent said platform means; guide means for guiding a strip of said tab material transversely across the end of said resistance element when it is in position on said platform means, said electrodes being spaced apart for contacting said tab material superjacent said resistance element and bring said tab material into intimate contact with said wire; and
   electrical power suply means connected to said electrodes for supplying welding power thereto.

2. The apparatus of claim 1 including also means for measuring the electrical resistance of said elements after said tabs have been welded to said wire comprising:
   an electrical conductor mounted on said body portion subjacent said strip of tab material; and
   electrical conduit means connecting said conductor to a percentage-bridge type test unit.

3. A method of manufacturing electrical resistance elements comprising the steps of:
   winding a plurality of turns of bare, resistance-type wire onto an insulated core, said wire having a predetermined melting point;
   fabricating a termination tab from a material having a melting point substantially higher than the melting point of said wire, said tab being of sufficient width to span a plurality of turns of said wire;
   placing said tab transversely across said core with a portion thereof in intimate contact with a plurality of turns of said wire; and
   supplying electrical energy to said tab by electrodes at opposite sides of said portion to heat said tab and fuse said wire onto said tab at said portion between said electrodes.

4. A method of welding a flat electrical termination tab to a resistance wire which is wound around an insulating member comprising the steps of
   placing a flat tab of ribbon material of substantially higher melting temperature than said wire transversely across a plurality of turns of said resistance wire at the desired location for a terminal;
   placing positive and negative electrodes against said tab on opposite sides of said wire to hold said tab against said wire; and
   passing a current between said electrodes and through said tab to heat the tab to a temperature above the fusion point of said wire and below the fusion point of said tab in order to fuse said plurality of turns of wire to said tab.

5. A method of welding as defined in claim 4 including the step of placing said wire wound member on insulating support means at the side of said member opposite said electrodes, and adjusting the position of said support means to obtain from the electrodes a desired pressure between said tab and said wire.

6. A method of welding as defined in claim 5 wherein said electrodes produce sufficient pressure in said ribbon material to crown the tab about the upper perimeter of the wire for intimate contact therewith.

7. A method of welding as defined in claim 5 including the step of placing a hold-down means against the surface of said wire wound member opposite said support means to maintain said wound member firmly in position on said support means.

8. A method of welding as defined in claim 4 wherein said resistance wire has a melting point approximately 1000° F. below the melting point of the ribbon material.

9. A method as defined in claim 4 including the step of placing said electrodes apart a distance of approximately 5½ times the width of the ribbon material.

10. A method as defined in claim 7 wherein said wires are Ni-Cr alloy and said ribbon is molybdenum.

11. A method as defined in claim 10 wherein said wire is approximately 0.0005" in diameter and said ribbon is 0.010" wide and 0.00085" thick.

12. A method as defined in claim 11 including the passing of about 1 watt second of energy through said ribbon material by said electrodes.

13. An apparatus for welding tabs to a resistance wire wound electrical resistance element comprising;
   support means for said element engaging one side of said element;
   a pair of spaced welding electrodes pivotally mounted at one end of said element about an axis transverse to the axis of said wire wound element;
   means for supplying a tab of ribbon material transversely to said element and over the perimeter thereof on the side opposite to said support means;
   said ribbon material having a temperature of fusion above that of the resistance wire;
   said electrodes being pivotally movable into engagement with said ribbon material at opposite sides of the contact between said ribbon material and said resistance wire; and
   means for producing electrical current through said electrodes and said ribbon material to fuse said resistance wire to said material to form said tab.

14. An apparatus as defined in claim 13 wherein said resistance element comprises a wire wound round mandrel; and
   means for holding said element on said support means during fusion of said resistance wire to said tab.

15. An apparatus defined in claim 14 wherein said resistance wire is formed of material having a fusion temperature approximately 1000° F. less than the fusing temperature of said ribbon material.

16. An apparatus defined in claim 15 wherein said resistance wire is Ni-Cr alloy and said ribbon is molybdenum.

17. An apparatus defined in claim 16 wherein said wire is approximately 0.0005" in diameter and said ribbon material is 0.010" wide and 0.00085" thick.

References Cited in the file of this patent

UNITED STATES PATENTS

| | | |
|---|---|---|
| 1,751,419 | Phelps | Mar. 18, 1930 |
| 1,920,630 | Conn | Aug. 1, 1933 |
| 2,019,457 | Lodge | Oct. 29, 1935 |
| 2,319,413 | Leathers et al. | May 18, 1943 |
| 2,371,438 | Gilliver | Mar. 13, 1945 |
| 2,459,228 | Konicek et al. | Jan. 18, 1949 |
| 2,527,138 | Kohler | Oct. 24, 1950 |
| 2,784,300 | Zuk | Mar. 5, 1957 |
| 3,030,562 | Maiden et al. | Apr. 17, 1962 |
| 3,089,020 | Hurlebaus | May 7, 1963 |

FOREIGN PATENTS

| | | |
|---|---|---|
| 558,472 | Great Britain | Jan. 6, 1944 |
| 1,001,361 | Germany | Jan. 24, 1957 |
| 610,791 | Canada | Dec. 20, 1960 |

Notice of Adverse Decision in Interference

In Interference No. 95,534 involving Patent No. 3,175,070, G. H. Elliott and W. W. Maves, WELDING APPARATUS AND METHOD, final judgment adverse to the patentees was rendered June 25, 1969, as to claim 3.
[*Official Gazette January 13, 1970.*]